Nov. 24, 1964

C. WEBER 3,158,159

MONEY-HANDLING DEVICES

Filed Dec. 12, 1961

INVENTOR:
CARL WEBER
BY Robert Gottschalk
ATTORNEY

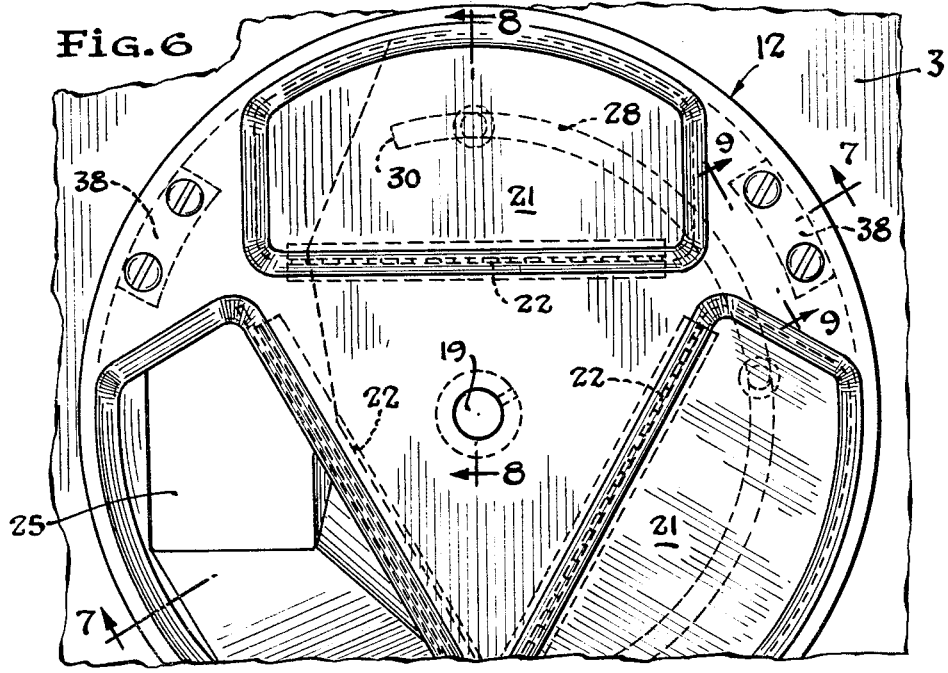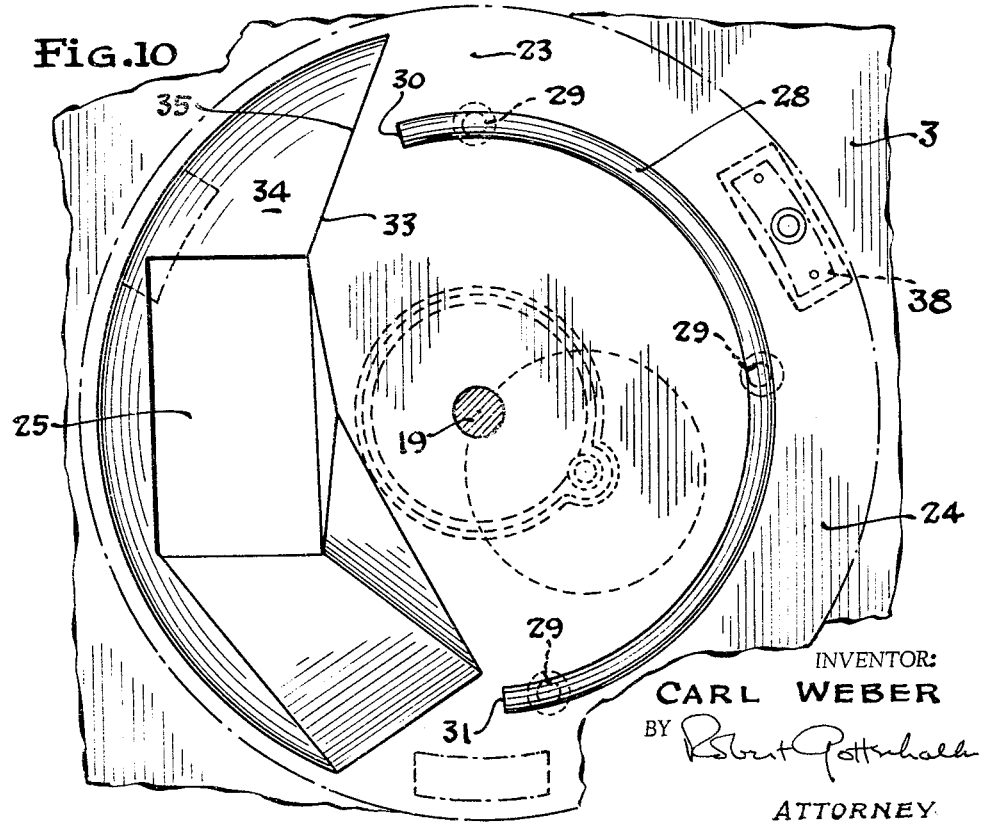

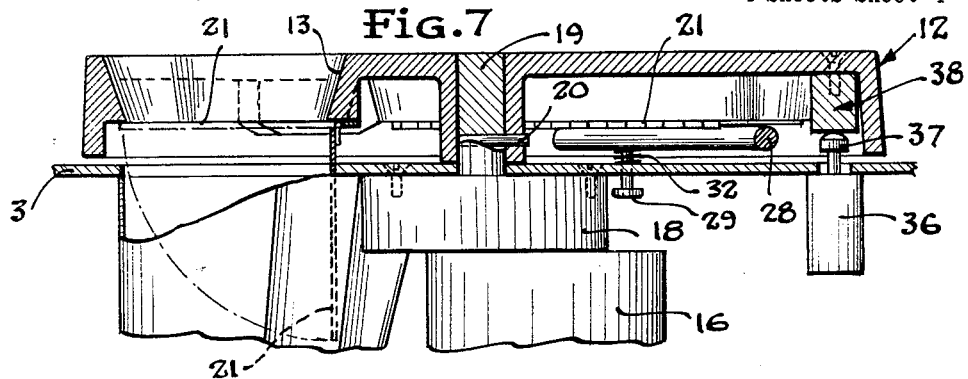
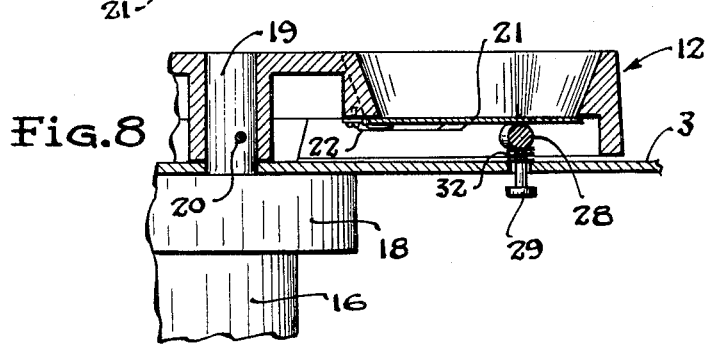
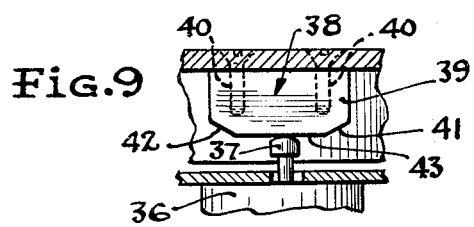
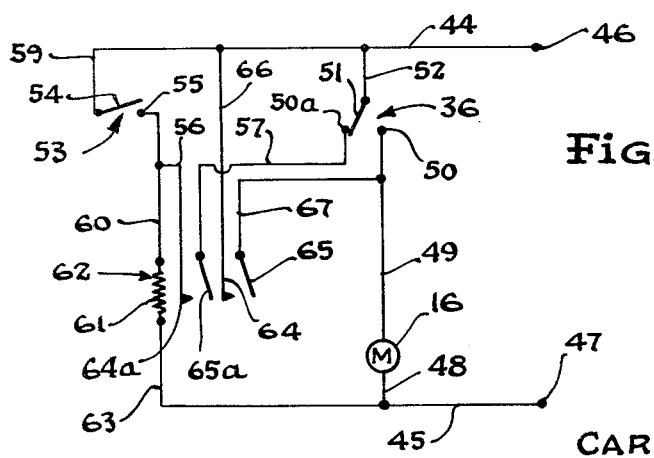

United States Patent Office 3,158,159
Patented Nov. 24, 1964

3,158,159
MONEY-HANDLING DEVICES
Carl Weber, Chicago, Ill., assignor to Automatic Canteen Company of America, Chicago, Ill., a corporation of Delaware
Filed Dec. 12, 1961, Ser. No. 158,848
4 Claims. (Cl. 133—3)

This invention relates to money-handling devices and more particularly, to money-handling devices which are particularly well adapted for use by cashiers, and the like, in transactions involving the taking in of money and the dispensing of change.

A primary object of the present invention is to afford a novel money-handling device.

Another object of the present invention is to afford a novel money-handling device wherein the parts thereof are so constituted and arranged that after a customer, or the like, has deposited his money with a cashier, this money becomes inaccessible to the customer, while remaining fully visible to him and the cashier during any change-making transaction which may be required.

Another object is to afford a novel money-handling device of the aforementioned type, wherein the money thus deposited by a customer may be automatically moved, in a novel and expeditious manner, to a position inaccessible to the customer during a change-making transaction.

Yet another object is to afford a novel money-handling device of the aforementioned type wherein the money thus deposited by a customer may be discharged into a place of safekeeping, such as, for example, the interior of a cabinet, in a novel and expeditious manner.

A further object is to afford a novel money-handling device of the aforementioned type wherein the parts thereof are so constituted and arranged that a cashier, or the like, may take in money from a customer, make change for the customer, and deposit the money thus taken in into a place of safekeeping, such as the interior of a cabinet, without physically touching either the money or the change.

Another object is to afford a novel money-handling device of the aforementioned type embodying a novel turntable, constituted and arranged in a novel and expeditious manner.

An object ancillary to the foregoing is to afford a novel turntable of the aforementioned type embodying a plurality of receptacles constituted and arranged in a novel and expeditious manner.

Another object is to afford a novel money-handling device of the aforementioned type, having a money-receiving station, wherein a customer, or the like, may deposit his money with a cashier, or the like; an intermediate station wherein the money thus deposited by the customer is visible to both the customer and the cashier; and a money-discharging station wherein the money thus taken from the customer may be discharged into a place of safekeeping, such as the interior of the cabinet, with the stations constituted and arranged in a novel and expeditious manner relative to each other.

A further object is to afford a novel money-handling device of the aforementioned type wherein the money taken in at the money-receiving station is moved through the intermediate station to the money-discharging station in a novel and expeditious manner.

Another object is to afford a novel money-handling device of the aforementioned type embodying stations and a turntable of the aforementioned type, and wherein the parts of the device are so constituted and arranged that the aforementioned receptacles in the turntable may be intermittently successively moved to each of the successive stations in a novel and expeditious manner.

Yet another object is to afford a novel money-handling device of the aforementioned type which is practical and efficient in operation and may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 6 is an enlarged fragmentary top plan view of a portion of the money-handling device shown in FIGS. 1–5;

FIG. 7 is a detail sectional view taken substantially along the line 7—7 in FIG. 6;

FIG. 8 is a fragmentary detail sectional view taken substantially along the line 8—8 in FIG. 6;

FIG. 9 is a fragmentary detail sectional view taken substantially along the line 9—9 in FIG. 6;

FIG. 10 is a fragmentary detail plan view similar to FIG. 6, but with the turntable removed; and FIG. 11 is a wiring diagram for the money-handling device shown in FIGS. 1–10.

Figure 1:
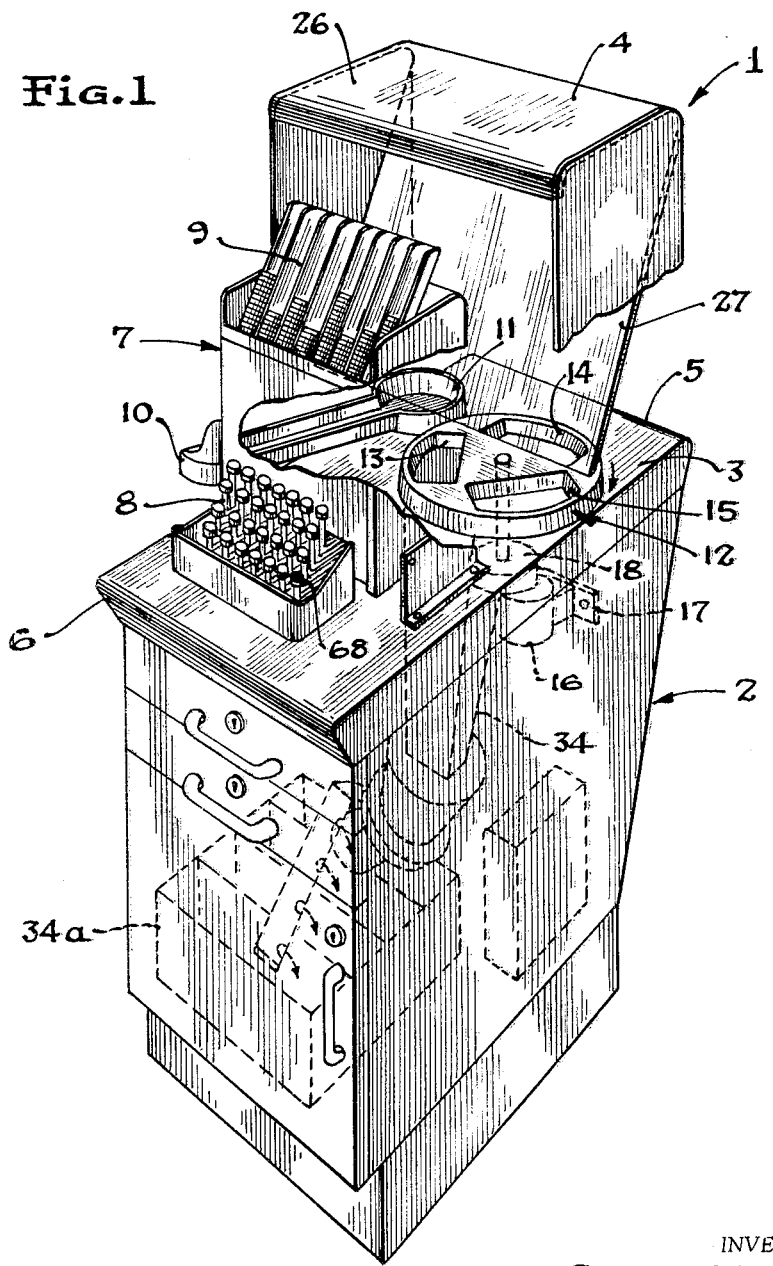
FIG. 1 is a perspective view of a money-handling device embodying the principles of the present invention.

A money-handling device 1 in the form of a cashier's unit, embodying the principles of the present invention, is shown in the drawings to illustrate the preferred embodiment of the present invention.

The money-handling device 1 includes, in general, a cabinet 2 having a top wall or counter top 3 on which is mounted a divider 4 separating the customer's side 5 of the money-handling device 1 from the cashier's side 6 thereof, FIG. 1.

The money-handling device 1 shown in the drawings includes a change-making unit 7, which may be any one of several suitable types of such units readily available on the market. The change-making unit 7 includes mechanism, not shown, which is effective, in response to the actuation of the proper one of a plurality of manually operable keys 8 to feed the proper amount of change from a coin-supply portion 9 downwardly along a chute 10 to an open-topped receptacle 11, which is disposed on the customer side 5 of the divider 4, FIG. 1.

A turntable 12, which is substantially circular in shape, has three upwardly opening, substantially cup-shaped compartments or receptacles 13, 14, and 15 in the upper face thereof, FIGS. 1–7. The receptacles 13–15 are equally spaced from each other around the periphery of a circle, which has the same radial center as that of the periphery of the turntable.

A motor 16 is mounted on a suitably supporting bracket 17 within the cabinet 2, FIG. 1. A gear reduction unit 18, FIGS. 1, 7, and 8, is mounted on the upper end portion of the motor 16 and is operatively connected thereto for operation thereby. The gear reduction unit 18 includes a drive shaft 19 which extends upwardly through the counter top 3, FIGS. 1 and 7, into the radial center of the turntable 12. The turntable 12 is secured to the drive shaft 19 by suitable means such as a pin 20, FIG. 7, and is rotatable with the drive shaft 19 upon rotation of the latter by the motor 16.

Each of the receptacles 13–15 includes a bottom wall 21, FIGS. 6, 7, and 8. The bottom walls 21 are hingedly connected to the turntable 12 by respective hinges 22 disposed at the radially inward side of the respective receptacles 13–15, for movement between a raised, closed position, as shown in solid lines in FIG. 7, and lowered, open position, as shown in broken lines for the bottom wall 21 of the receptacle 13 in FIG. 7. When the bottom walls 21 are disposed in the aforementioned closed position they are effective to close the bottoms of the receptacles 13–15, and when they are disposed in the aforementioned open position the bottoms of the respective receptacles are open, for a purpose which will be discussed in greater detail presently.

The turntable 12, in the operation of the money-handling device 1, is rotatable by the motor 16 in a clockwise direction, as viewed in FIGS. 2–5, to sequentially rotate the receptacles 13–15 through three positions or work stations, namely, a money-receiving position 23, an intermediate position 24, and a money-discharging position 25. As may be seen in FIGS. 1–5, the money-receiving position 23 is disposed on the customer side 5 of the divider 4, and the intermediate position 24 and the money-discharging position 25 are disposed on the cashier's side 6 of the divider 4.

The divider 4 includes a supporting frame 26 mounted on the cabinet 2, and a transparent wall member 27 made of suitable transparent material such as a sheet of glass or transparent plastic material. The wall member 27 is supported by the frame 26, and terminates at its lower edge in upwardly spaced relation to the counter top 3 of the cabinet 2, in closely overlying relation to the turntable 12 and the end of the chute 10 to which the receptacle 11 is attached, FIGS. 1–5. With this construction, the receptacle 11 is readily accessible to a person standing on the customer side 5 of the money-handling device 1, but is inaccessible to a person standing on the cashier's side 6 thereof. Also, with this construction, each of the receptacles 13–15, when it is disposed in the money-receiving position 23, is readily accessible to a person standing on the customer side 5 of the money-handling device 1, but is inaccessible to a person standing on the cashier's side 6 thereof. Conversely, when the receptacles 13–15 are disposed in the intermediate position 24 or the money-discharging position 25, they are readily accessible to a person standing on the cashier's side 6 of the money-handling device 1 but are inaccessible to a person standing on the customer's side 5.

The positions or stations 23–25 are equally spaced from each other around the periphery of a circle, with the position 24 being spaced from the position 23 one hundred and twenty degrees in a clockwise direction, as viewed in FIGS. 2–5, and the position 24 being spaced from the position 24 one hundred and twenty degrees in a clockwise direction as viewed in FIGS. 2–5.

A supporting member, in the form of an elongated bar 28 is mounted on suitable supporting members, such as pins 29 mounted in and projecting upwardly from the counter top 3, FIGS. 7 and 10. The bar 28 is in the form of an arc of the aforementioned circle along which the receptacles 13–15 move, and the pins 29 are disposed in position to support the bar 28 in underlying relation to the turntable 12, with the radial center of the bar 28 disposed at the radial center of the turntable 12.

The arc of the bar 28 is somewhat more than one hundred and eighty degrees, and the bar 28 is disposed in such position on the counter top 3 that one end 30 thereof is disposed between station 25 and station 23, and the other end 31 is disposed between station 24 and 25, the bar 28 extending through stations 23 and 24, FIGS. 6 and 10.

Compression springs 32 are mounted on each of the pins 29 in underlying relation to the bar 28 and are effective to yieldingly urge the bar 28 upwardly into engagement with the bottom of the turntable 12 in position to hold the bottom walls 21 of the receptacles 13–15 in the aforementioned closed position, when the receptacles 13–15 are disposed in either the money-receiving position 23 or the intermediate position 24, and during movement of the receptacles 13–15 between these last-mentioned two positions.

The counter top 3 has an opening 33 therein at the aforementioned coin-discharging position 25, the opening 33 projecting from the coin-discharging position 25 toward both the coin-receiving position and the intermediate position 24, but terminating in spaced relation thereto, FIG. 10. A coin chute 34 extends downwardly from the opening 33, FIGS. 1 and 10, into the cabinet 2 in position to discharge money or other material dropped into the opening 33 into a coin sorter 34a in the bottom of the cabinet 2. The coin sorter 34a may be any one of several suitable types which are well known in the art and readily available on the market.

The opening 33 is of such size and configuration, and is so disposed relative to the bar 28, that when the receptacles 13–15 move from the intermediate position 24 to the coin-discharging position 25, during the aforementioned rotation of the turntable 12, the bottom walls 21 thereof move out of engagement with the bar 28 as the bottom walls 21 move into position over the opening 33, to thereby permit the bottom walls 21 to swing downwardly into the aforementioned open position in the opening 33 to thereby discharge any money, or the like, in the respective receptacles 13–15, into the coin chute 34 for discharge into the cabinet 2. As may be seen in FIG. 10, the shape of the opening 33 is such that during rotation of the receptacles 13–15 from the coin-discharging position 25 to the coin-receiving position 23, the trailing edge 35 of the opening 33 is disposed in position to engage the open bottom wall 21 and cam it upwardly toward closed position into position wherein the bar 28 is effective to engage the last-mentioned bottom wall 21 and move it into fully closed position as its respective receptacle 13–15 moves into the coin-receiving position 23.

Thus, it will be seen that in the operation of the novel money-handling device 1, a customer, standing on the customer side 5 thereof may place his money into the receptacle 13, 14, or 15 disposed in the money-receiving position 23. The turntable 12 may then be rotated one-third of a revolution, in a clockwise direction, as viewed in FIGS. 2–5, to thereby rotate that receptacle 13, 14, or 15 from the money-receiving position 23 into the intermediate position 24, in which it is visible both to a person on the cashier's side 6 of the device 1 and to the customer on the customer side 5 thereof, but is inaccessible to the person on the customer side 5. The turntable 12 may then be rotated through another one-third of a revolution to thereby advance the last-mentioned receptacle 13, 14, or 15 from the intermediate station 24 to the money-discharging position 25, in which latter position the money in that receptacle is discharged into the interior of the cabinet 2. The turntable 12 may then be rotated through another one-third of a revolution in a clockwise direction to thereby return the receptacle 13, 14 or 15 to the money-receiving position 23, to thereby complete a complete revolution of the turntable 12. It will be seen that during each one-third rotation of the turntable 12, all of the receptacles 13–15 are advanced one station in a clockwise direction, as viewed in FIGS. 2–5, and when any one of the receptacles 13–15 is disposed at money-receiving position 23, the other two receptacles are disposed at respective ones of the intermediate position 24 and the money-discharging position 25.

With this operation of the money-handling device 1, it will be seen that while the receptacle 13, 14, or 15 into which the customer has deposited his money is being advanced to the intermediate position 24, or while the last-mentioned receptacle is disposed at the intermediate position 24, a cashier may make change for the customer so that the change is made and both the customer and the cashier may check the accuracy of the transaction while the money, which has been deposited by the customer, is visible to both the customer and the cashier at the intermediate station 24. With this construction and mode of operation, the money, which has been deposited by the customer, is disposed in such position that it is on the other side of the divider 4 from the customer, and is, therefore, inaccessible to him, by the time his change is made available to him.

Thereafter, as part of the same transaction, the turntable may be rotated through another one-third of a revolution to thereby move the receptacle 13, 14, or 15 in which the customer's money was deposited, to the money-discharging station 25, wherein the bottom wall 21 falls open to thereby discharge the money down through the opening 33 and the chute 34 into the interior of the cabinet 2. However, preferably this money-discharging operation is performed during the next customer transaction, the receptacle 13, 14, or 15 in which the first customer's money reposes being moved from intermediate position 24 to money-discharging position 25, during movement of the next receptacle 15, 13, or 14, respectively, from money-receiving position 23 to intermediate position 24.

The mechanism for stopping the rotation of the turntable 12 of the money-handling device 1 at the completion of each one-third of a revolution thereof includes a switch 36 having an actuating member 37. The switch 36 is attached to the lower face of the counter top 3, with the actuating member 37 projecting upwardly through the counter top 3 in position to be operatively engaged by three abutment members 38 mounted on, and carried by the turntable 12 in equally spaced relation to each other around the periphery of the turntable 12, FIGS. 2–7 and 9. The abutment members 38 are identical in construction and each includes a block 39 of suitable material such as, for example, aluminum or steel secured to the turntable 12 by suitable means such as screws 40. The blocks 39 each includes a tapered leading lower edge 41 and a tapered trailing lower edge 42, connected by a substantially horizontally extending intermediate lower edge portion 43, FIG. 9. The blocks 39 are so disposed on the turntable 12 that when the turntable is disposed at each normal, at-rest position, wherein the receptacles 13–15 are disposed at respective ones of the stations 23–25, the intermediate lower edge portion of one of the respective blocks 39 is operatively engaged with the actuating member 37 of the switch 36 in position to hold the switch 36 in open position, for a purpose which will be described in greater detail presently. During rotation of the turntable 12 from the aforementioned at-rest position, the block 39 previously engaged with the abutment member 37 on the switch 36 moves out of engagement therewith and thereby permits the actuating member 37 to move upwardly to thereby close the switch 36, the switch 36 remaining in this closed position until the next succeeeding one of the blocks 39 moves with the turntable 12 into position to again operatively engage the actuating member 37 and thereby open the switch 36.

Referring now to FIG. 11, it will be seen that the novel money-handling device 1 includes two electrical conductors 44 and 45, such as, for example, suitable electrical wires, adapted to be connected to opposite sides 46 and 47, respectively, of a suitable source of electrical power, not shown. One side of the motor 16 is connected by an electrical conductor 48 to the conductor 45, and the other side of the motor 14 is connected by an electrical conductor 49 to a stationary contact 50 of the switch 36. The switch 36 includes another stationary contact 50a and a movable contact 51. The movable contact is movable between the stationary contacts 50 and 50a, being engaged with the contact 50a, when the actuating member 37 of the switch 36 is in the aforementioned open position, and being disposed in engagement with the stationary contact 50 when the actuating member 37 is disposed in the aforementioned closed position. The movable contact 51 is connected by a conductor 52 to the conductor 44.

The control mechanism for the motor 16, shown in FIG. 11, also includes a manually operable switch 53, which includes a movable contact 54 and a stationary contact 55. The movable contact 54 is connected by an electrical conductor 59 the conductor 44, and the stationary contact 55 is connected by an electrical conductor 60 to one end of the winding 61 of a relay switch 62. The other side of the winding 61 is connected by a conductor 63 to the conductor 45.

The relay switch 62 includes two stationary contacts 64 and 64a and two movable contacts 65 and 65a, and contacts 64 and 64a being out of engagement with the contacts 65 and 65a, respectively, when the winding 61 is de-energized, and the contacts 64 and 64a being disposed in engagement with the contacts 65 and 65a, respectively, when the winding 61 is energized. The stationary contact 64 of the relay switch 62 is connected by a conductor 66 to the conductor 44, and the movable contact 65 is connected by a conductor 67 to the conductor 49. The stationary contact 64a is connected by a conductor 56 to the conductor 60, and the movable contact 65a is connected by a conductor 57 to the stationary contact 51a of the switch 36.

With the money-handling device constructed in this manner, and with one of the blocks 39 disposed in the aforementioned operative engagement with the actuating member 37 of the switch 36 to thereby hold the switch 36 in open position, rotation of the turntable 12 may be initiated by the closing of the switch 53. The closing of the switch 53 is effective to energize the relay switch 62 and the motor 16 to thereby initiate rotation of the turntable 12. The circuit for such energization of the relay switch 62 extends from the one side 46 of the power source through the conductor 44, the conductor 59, the switch 53, the conductor 60, the winding 61 of the relay switch 62, the conductor 63, and the conductor 45 to the other side 47 of the power source. This energization of the winding 61 of the relay switch 62 is effective to engage the contacts 65 and 65a with the contacts 64 and 64a to thereby energize the motor 16 and afford a holding circuit for the relay switch 62. The circuit for thus energizing the motor 16 extends from the one side 46 of the power source through the conductor 44, the conductor 66, the stationary contact 64 of the relay switch 62, the movable contact 65 of the relay switch 62, the conductor 67, the conductor 49, the motor 16, and the conductor 48, and the conductor 45 to the other side 47 of the power source. The aforementioned holding circuit for the relay switch 62 extends from the one side 46 of the power source through the conductors 46 and 52, the contacts 51 and 50a of the switch 36, the conductor 57, the contacts 65a and 64a of the relay switch 62, the conductors 56 and 60, the winding 61 of the relay switch 62, and the conductors 63 and 45 to the other side 47 of the power source.

It will be remembered that energization of the motor 16 is effective to cause rotation of the turntable 12 in a clockwise direction, as viewed in FIGS. 2–5. Such rotation of the turntable 12 is effective to move the block 39, which was in engagement with the actuating member 37 of the switch 36 when the turntable 12 was stationary, out of engagement with the actuating member 37 to thereby permit the switch 36 to close. The closing of the switch 36 affords a second circuit for energizing the motor 16, which second circuit is effective to maintain energization of the motor 16 until the switch 36 is again opened by the engagement of the next succeeding block 39 with the actuating member 37. This second circuit extends from one side 46 of the power source through the conductor 44, the conductor 52, the movable contact 51 of the switch 36, the stationary contact 50 of the switch 36, the conductor 49, the motor 16, the conductor 48, and the conductor 45 to the other side 47 of the power source. Hence, it will be seen that when the switch 53 is closed, the winding 16 of the relay switch is immediately energized, and is maintained energized by the aforementioned holding circuit therefor. At the same time, the motor 16 is energized by the aforementioned circuit therefor through the contacts 64 and 65 of the relay switch 62. After the motor has thus been energized for a sufficient time to cause the motor 16 to rotate the turntable 12 through the relatively short distance necessary to move a block 39, which has been engaged with the actuating member 37 of the switch 36 out of engagement with the actuating member 37, the movable contact 51 of the switch 36 moves out of engagement with the contact 50a to thereby break the aforementioned holding circuit for the relay switch 62, but, at the same time, the contact 51 moves into engagement with the contact 50 to thereby establish the aforementioned circuit therethrough for the motor 16. Thus, the motor 16 remains energized until the turntable 12 has completed a full one-third revolution, and the switch 36 is then opened by the engagement of the next succeeding block with the actuating member 37. If, for any reason, continued rotation of the turntable 12 is desired, the operator thereof may maintain the switch 53 in closed position to thereby continuously complete the aforementioned circuit through the relay switch 62 and the motor 16 and thereby cause continued rotation of the turntable 12 irrespective of whether or not the switch 36 is open or closed.

Preferably, the switch 53 is actuated by each of the manually operable change-making keys 8 of the change-making mechanism 7, and, also, by a special key or switch actuating member, such as the key 68, on the change-making mechanism 7. The key 68 may be a special key which is ineffective to cause a change-making operation of the mechanism 7, but is connected only to the switch 53 for effecting rotation of the turntable 12, so that, when desired, the operator may effect rotation of the turntable 12 without effecting a change-making operation.

Figure 2:
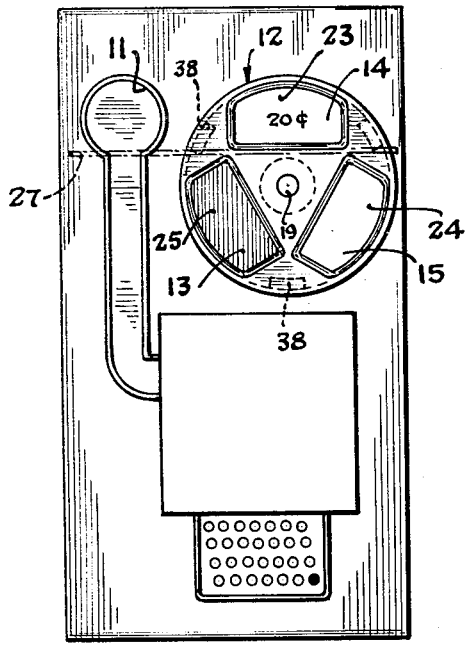
FIG. 2 is a top plan view of the device shown in FIG. 1, with certain parts removed to shown underlying parts.
Figure 3:
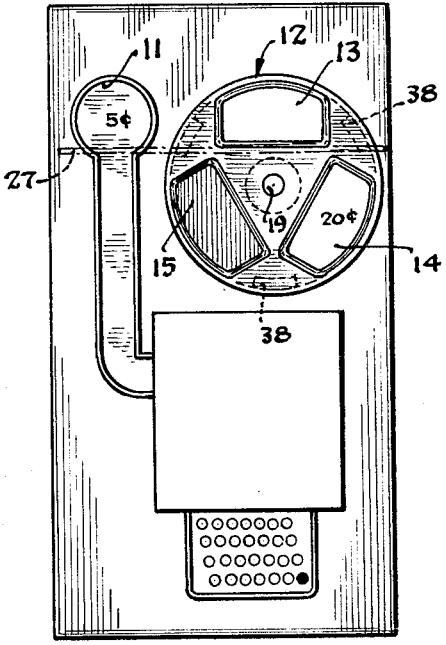
FIG. 3 is a top plan view similar to FIG. 2, but with certain parts disposed in different operative position.

In the typical operation of the money-handling device 1, as shown in the drawings, a customer might place twenty cents in the receptacle 14 disposed at the money-receiving station 23, as shown in FIG. 2. Assuming that the purchase for which the customer is paying amounted to fifteen cents, the cashier may then depress the proper key 8 on the change-making mechanism 7 effective to return five cents change to the customer. The depression of the last-mentioned key 8, it will be remembered, is effective to energize the motor 16 to thereby advance the turntable 12 through one-third of a revolution in a clockwise direction. This is effective to move the receptacle 14, with the twenty cents therein, into the intermediate position 24, as shown in FIG. 3. During this movement of the receptacle 14, five cents in change is returned to the customer through the chute 10 into the receptacle 11, by the operation of the change-making mechanism 7 caused by the actuation of the last-mentioned key 8. Thus, the customer is given his change, while the money which he has deposited in the turntable 12 is still readily visible to him and to the cashier, but is no longer accessible to him, the receptacle 14 having moved on the other side of the divider 4 from the customer.

Figure 4:
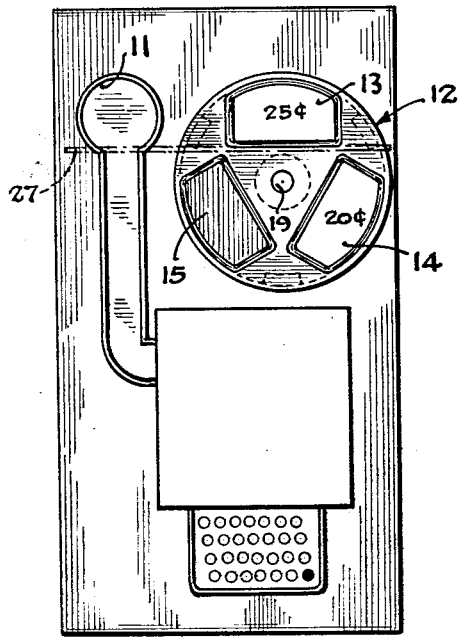
FIG. 4 is a top plan view similar to FIGS. 2 and 3, but with certain parts disposed in different operative position.
Figure 5:
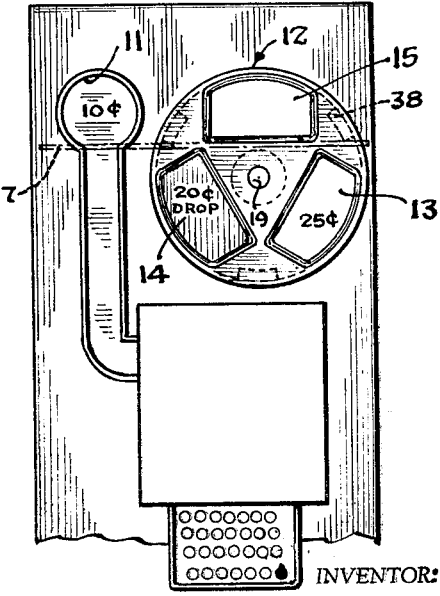
FIG. 5 is a fragmentary top plan view similar to FIGS. 2–4, but with certain parts disposed in different operative position.

When the next customer approaches the money-handling device 1, he may place his money, such as, for example, a quarter, in the receptacle then positioned at the money-receiving position 23, in this instance, the receptacle 13, as shown in FIG. 4. Assuming that his purchase was in the amount of fifteen cents, the cashier would again press the proper key 8 which would be effective to cause the change-making mechanism 7 to return ten cents change to the customer through the chute 10 into the receptacle 11. This actuation of the last-mentioned key 8 is effective to cause the turntable 12 to advance another one-third of a revolution. This partial rotation of the turntable 12 is effective to move the receptacle 14 from the intermediate station 24 to the money-discharging station 25 at which latter station the twenty cents previously placed in the receptacle 14 by the first-mentioned customer is discharged from the receptacle 14 downwardly through the opening 33 into the coin sorter 34a in the cabinet 2. At the same time, this last-mentioned partial rotation of the turntable 12 is effective to rotate the receptacle 13 from the money-receiving position 23 into the intermediate position 24. This operation may be quickly and easily accomplished for each successive customer, the turntable 12 being rotated one-third of a revolution during each transaction to thereby intermittently advance each of the receptacles 13–15 through each of the stations 23–25.

It will be appreciated by those skilled in the art, that the change-making mechanism 7 forms no part of the present invention except as insofar as it forms part of my novel combination, and that the novel money-handling device may embody a manually operated switch like the switch 53, with the cashier manually making change for the customer, without departing from the purview of the present invention.

From the foregoing, it will be seen that my novel money-handling device affords a novel mechanism which is well adapted for use by a cashier, and the like, in transactions involving the taking in of money and the making of change.

Also, it will be seen that it affords a novel mechanism effective to insure that a customer will not be able to pick up the money which he has deposited after his change has been dispensed to him.

In addition, it affords novel mechanism which is effective to enable a cashier to take in money and to give change therefor without physically handling either the money taken in or the change.

In addition, it will be seen that the present invention affords a novel money-handling device which is practical and efficient in operation and may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A money-handling device of the type adapted to be used by a cashier, and the like, in receiving money from a customer, said device comprising supporting means having a money-receiving side and a money-discharging side, a turntable rotatably mounted on said supporting means in horizontally extending overlying relation to both of said sides, said turntable having three upwardly opening receptacles equally spaced from each other around the periphery of a circle in the upper face of said turntable, means for rotating said turntable through a unidirectional path of movement effective to move said receptacles, one after the other, from one position on said one side of said supporting means for the deposit of money therein by such a customer, to a second position on said other side of said supporting means, then to a third position on said other side of supporting means, and then back to said one position, discharge means disposed below said turntable at said third station, manual means actuatable by said cashier to initiate the return of change to said customer, and means closing the bottoms of said receptacles when said receptacles are disposed at said first and second stations, said receptacles being open at the bottom with said bottoms opening into said discharge means when said receptacles are disposed at said third station, and means operatively connected to said manual means for rotating said turntable on actuation of said manual means.

2. A money-handling device comprising supporting means having a cashier's side and a customer's side, an electrically operable change-maker including a plurality of switches, a plurality of manually operable actuating members disposed at said cashier's side and operatively connected to respective ones of said switches for actuating the latter, means operatively connected to said switches for feeding respective predetermined amounts of change to said customer's side upon operation of respective ones of said actuating members, a turntable having a plurality of receptacles therein equally spaced around the periphery of a circle having its center at the center of rotation of said turntable, means operatively connected to said turntable and to said switches for rotating said turntable a predetermined distance around said center of rotation between stationary positions upon each actuation of any of said switches, said device having one station for the deposit of money in said receptacles, a second station spaced from said one station said predetermined distance along said periphery of said circle in the direction of rotation of said turntable, and a third station disposed between said one and second stations, on said circle and spaced from said second station in said direction of rotation, said receptacles being so positioned relative to each other that when said turntable is disposed in any one of said stationary positions one of said receptacles is disposed at said one station and two other of said receptacles are disposed at said second and third stations, respectively, and walls mounted on the bottom of said receptacles, said wall on each receptacle being disposed in open position to thereby open the bottom of said receptacle when said receptacle is disposed at said third station, said wall on each receptacle being disposed in closed position to thereby close the bottom of said receptacle in all other positions of said receptacle.

3. A device defined in claim 2 which includes a coin sorter, and means disposed at said third station in position to discharge the contents of said receptacles into said coin sorter when said receptacles are disposed at said third station.

4. A money-handling device comprising supporting means, guard means mounted on said supporting means, a receiving station on one side of said guard means, said station being accessible from said one side of said guard means and inaccessible from the other side thereof, an intermediate station, a discharging station, said last two-mentioned stations being disposed on said other side of said guard means and being accessible from said other side of said guard means and inaccessible from said one side of said guard means, a turntable having three upwardly opening receptacles therein, means operatively connected to said turntable for rotating the latter through a path of movement effective to sequentially move each of said receptacles through all of said stations, each of said receptacles having a bottom movable between open and closed positions, means mounted on said supporting means and engageable with said bottoms during said rotation of said turntable in position to hold said bottoms in closed position at said receiving and intermediate stations, and to permit said bottoms to move into open position at said discharge station, and means at said discharge station for restoring said bottoms to a closed position during movement of said turntable, and in which said means engageable with said bottoms comprises a bar yieldingly mounted on said supporting means in position to yieldingly supportingly engage said bottoms in all positions except when disposed at said discharge station.

References Cited by the Examiner
UNITED STATES PATENTS

| | | | |
|---|---|---|---|
| 1,804,776 | 5/31 | James | 109—19 |
| 1,813,841 | 7/31 | Fast | 133—3 |
| 1,926,914 | 9/33 | Popov | 198—209 |
| 2,088,038 | 7/37 | Scott et al. | 221—259 |
| 2,192,441 | 3/40 | Hills | 198—209 |
| 2,500,243 | 3/50 | Dixon | 198—209 |
| 2,968,518 | 1/61 | Braunsberg | 312—97.1 |

LEVERNE D. GEIGER, LOUIS J. DEMBO, *Examiners.*
RAPHAEL M. LUPO, *Primary Examiner.*